Figure 1:
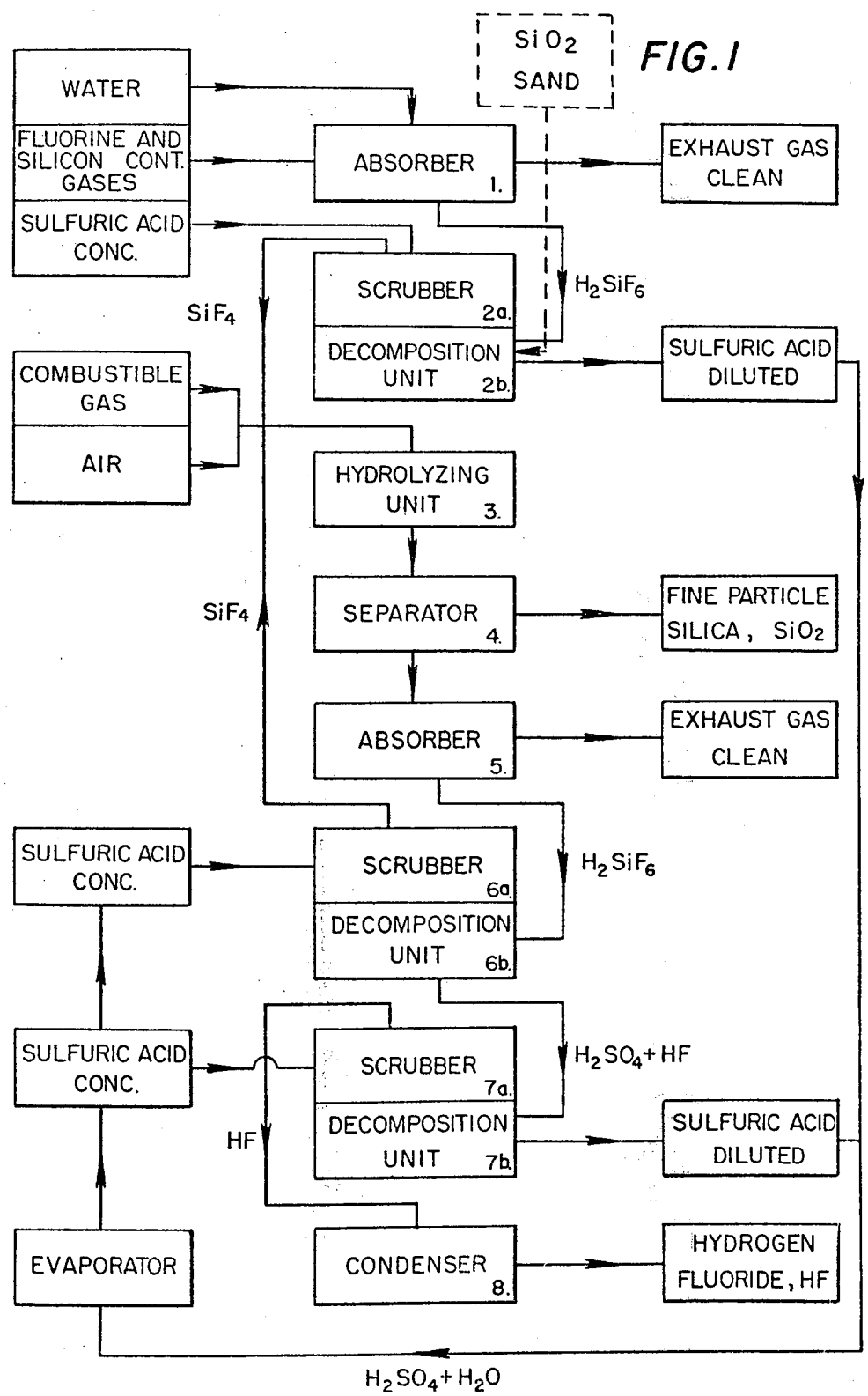

United States Patent [19]

Flemmert

[11] 3,969,485
[45] July 13, 1976

[54] PROCESS FOR CONVERTING SILICON-AND-FLUORINE-CONTAINING WASTE GASES INTO SILICON DIOXIDE AND HYDROGEN FLUORIDE

[76] Inventor: Gosta Lennart Flemmert, Hamngatan 22, Nynashamn, Sweden

[22] Filed: Dec. 4, 1974

[21] Appl. No.: 529,315

Related U.S. Application Data

[63] Continuation-in-part of Ser. No. 193,467, Oct. 28, 1971, abandoned.

[52] U.S. Cl.............................. 423/337; 423/240; 423/484
[51] Int. Cl.²......................................... C01B 33/18
[58] Field of Search ........... 423/335, 336, 337, 483, 423/484, 489, 240, 341; 106/288 B

[56] References Cited
UNITED STATES PATENTS

| | | | |
|---|---|---|---|
| 1,960,347 | 5/1934 | Osswald | 423/484 |
| 2,819,151 | 1/1958 | Flemmert | 423/337 |
| 3,203,759 | 8/1965 | Flemmert | 423/337 |
| 3,218,124 | 11/1965 | Oakley | 423/483 |
| 3,273,963 | 9/1966 | Gunn | 423/336 |
| 3,660,025 | 5/1972 | Driscoll | 423/336 |
| 3,661,519 | 5/1972 | Driscoll | 423/336 |

FOREIGN PATENTS OR APPLICATIONS 833,143   4/1960   United Kingdom.................. 423/336

OTHER PUBLICATIONS

Brescia, F., et al. Fundamentals of Chemistry, Academic Press, N.Y., (1966) p. 319.

*Primary Examiner*—L. Dewayne Rutledge
*Assistant Examiner*—Michael L. Lewis

[57] ABSTRACT

A process is provided for converting silicon and fluorine-containing waste gases into silicon dioxide and hydrogen fluoride, absorbing the waste gases in water to form hydrofluosilicic acid, decomposing the hydrofluosilicic acid in the presence of concentrated sulfuric acid to form silicon tetrafluoride and hydrogen fluoride, converting the silicon tetrafluoride in the vapor phase to silica and hydrogen fluoride, and recovering the hydrogen fluoride.

29 Claims, 2 Drawing Figures

PROCESS FOR CONVERTING SILICON-AND-FLUORINE-CONTAINING WASTE GASES INTO SILICON DIOXIDE AND HYDROGEN FLUORIDE

This application is a continuation-in-part of Ser. No. 193,467, filed Oct. 28, 1971, and now abandoned.

When phosphate rock is decomposed with strong mineral acid to produce phosphoric acid or a phosphate such as superphosphate or triple superphosphate, or when phosphoric acid is concentrated, or when glass is etched with hydrofluoric acid, silicon tetrafluoride and fluosilicic acid are formed as by-products, and appear in the waste gases together with small amounts of hydrogen fluoride. Also when hydrogen fluoride is manufactured for silica containing fluorspar, silicon tetrafluoride and hydrofluosilicic acid are formed. These fluorine-and silicon-containing compounds have very little economic value, and have usually been disposed of by venting the waste gases to the atmosphere. The small amounts of hydrogen fluoride that may appear in such gases are usually not sufficiently great to warrant recovery. However, these waste gases are highly corrosive, because silicon tetrafluoride is reacted with water to form silica and hydrogen fluoride. With the emphasis today on avoiding pollution of the environment, it has become necessary to avoid the discharge of such materials to the atmosphere, and to develop an economic process for doing so.

Mohr and Obrecht, Campbell and Messinger, U.S. Pat. No. 3,257,167, patented June 21, 1966, proposed to treat waste silicon tetrafluoride with water to form fluosilicic acid and silica. The silica is filtered from the reaction products, and the fluosilicic acid is decomposed with sulfuric acid to form hydrogen fluoride and silicon tetrafluoride. The hydrogen fluoride is recovered in concentrated form, while the silicon tetrafluoride is recycled. Thus, the products obtained from the process are silica and hydrogen fluoride. The problem in the process is the recovery of the silica, because this is quite difficult to separate by filtration from a liquid suspension.

U.S. Pat. No. 3,218,124, patented Nov. 16, 1965, to Oakley and Houston, also describes a process for the recovery of hydrogen fluoride as a dry gas from clear fluosilicic acid-containing solutions. Concentrated sulfuric acid is used; the reaction is conducted in the absence of free silica, and a minimum amount of silicon tetrafluoride is produced in the reaction, the product being mainly essentially dry hydrogen fluoride, which is liberated as a gas. The silicon tetrafluoride is hydrolyzed with water to form silica and fluosilicic acid, and the silica, which is hydrated, is separated by filtration. Again, the difficulty in this process is the filtration step.

Flemmert, U.S. Pat. No. 3,087,787, patented Apr. 30, 1963, proposed a multiple stage process in which silicon tetrafluoride is converted into silicon dioxide and hydrogen fluoride in the vapour phase in the presence of water vapour. In this process, sodium fluosilicate is formed in one stage, and is decomposed to form sodium fluoride and silicon tetrafluoride. However, this thermal decomposition is difficult to control, when large quantities of sodium fluosilicate are to be decomposed.

In accordance with the present invention, a process is provided for producing pure hydrogen fluoride and highly active silicon dioxide from silicon-and fluorine-containing waste gases, the silicon and fluorine being present as silicon tetrafluoride and hydrogen fluoride, as well as in some cases, small amounts of silicon dioxide. The silicon-and fluorine-containing compounds, such as silicon tetrafluoride, are first converted into hydrofluosilicic acid. This is decomposed in the presence of concentrated sulfuric acid to form silicon tetrafluoride, and the silicon tetrafluoride is hydrolyzed in the vapour phase in the presence of water vapour to form silica. The hydrogen fluoride obtained from decomposition of hydrofluosilicic acid and from silicon tetrafluoride is then combined, and purified by reconversion to hydrofluosilicic acid, which is again decomposed in the same manner as before, using concentrated sulfuric acid, while silicon tetrafluoride formed as a by-product is recycled. Thus, the two products recovered in the process of the invention are a highly purified hydrogen fluoride and silica.

The process of the invention utilizes the following reactions, some of which may be repeated one or more times to increase the purity of the reaction products that are recovered, and to improve the separation of the various reaction mixtures into recoverable and recyclable components:

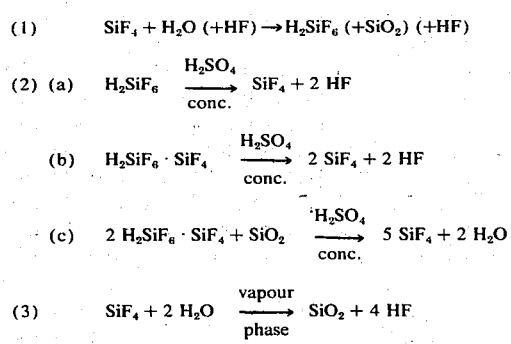

The several stages employed in the process of the invention are illustrated in the flow sheets in the drawings, which represent preferred embodiments of the invention.

Figure 2:
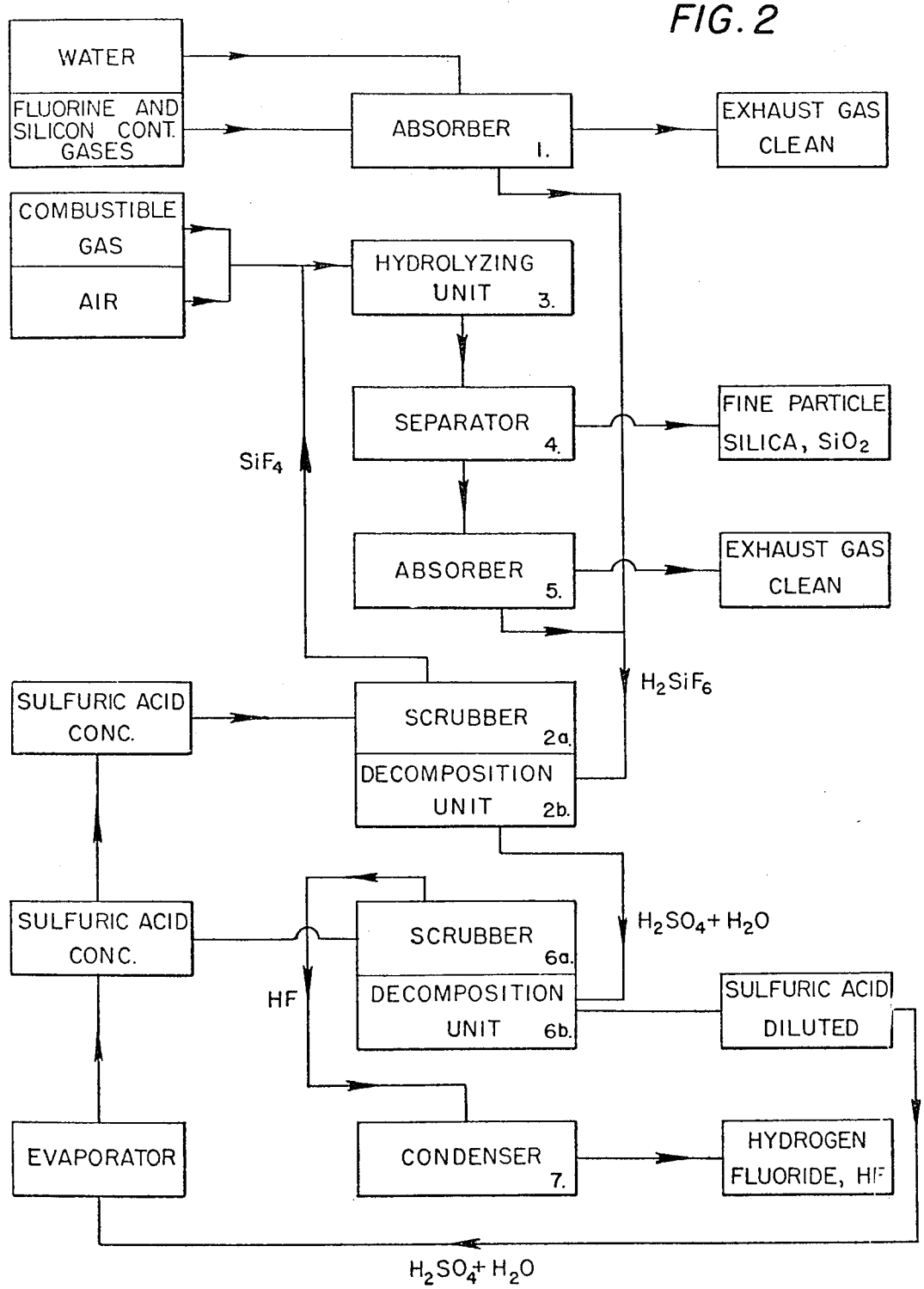

FIG. 1 represents a reaction sequence in which silicon-and fluorine-containing gases are decomposed by sulfuric acid to form silicon tetrafluoride, which is hydrolyzed to form silicon dioxide, and the unreacted silicon tetrafluoride and hydrogen fluoride recovered, converted to hydrofluosilicic acid, and again decomposed with the sulfuric acid; and FIG. 2 represents a similar reaction sequence in which hydrofluosilicic acid from the silicon-and fluorine-containing gases and from the hydrolysis of silicon tetrafluoride are combined and decomposed to form silicon tetrafluoride.

The first stage of the process of the invention is the absorption of the silicon-and fluorine-containing compounds from the exhaust gases in water. Hydrogen fluoride is quite water-soluble, and dissolves quickly. Silicon tetrafluoride is hydrolyzed to form hydrofluosilicic acid, as shown in Reaction (1). In addition, if the silicon tetrafluoride concentration is high, finely divided but undissolved silicon dioxide will also be formed in the aqueous hydrofluosilicic acid solution. Consequently, high silica fluosilicic acid may also be formed in the solution, having the approximate composition $H_2SiF_6 \cdot SiF_4$. The waste gases may also contain a proportion of silicon dioxide, which will remain suspended in the aqueous fluosilicic acid solution.

The absorption can be carried out at room temperature. The waste gases can be brought in contact with a spray of water, preferably flowing countercurrently to the gas flow, to improve the mixing. This type of operation is particularly adapted for a continuous process. A high enough proportion of water to waste gases is used to remove substantially all of the silicon-and fluorine-containing components thereof.

This absorption process is known, and consequently further details need not be given.

The solution of hydrofluosilicic acid and silicon dioxide or hydrogen fluoride is then reacted with sulfuric acid to form silicon tetrafluoride and hydrogen fluoride, in accordance with Reaction 2(a). The same products are formed from hydrofluosilic acid mixed with silicon tetrafluoride, high silica fluosilicic acid of the composition $H_2SiF_6SiF_4$, as shown in Reaction 2(b), and when silicon dioxide is present as well, silicon tetrafluoride is formed also (Reaction 2(c)), but in this case, the by-product is water instead of hydrogen fluoride.

The sulfuric acid does not, in fact, take part in this reaction but functions only as an absorption agent for any hydrogen fluoride or water that may be formed, besides producing an acidic reaction medium which favors the reaction.

It will be seen from Reactions 2(a), (b) and (c) that the proportion of hydrogen fluoride to silicon tetrafluoride that is formed in this reaction depends upon the relative proportions of hydrofluosilicic acid and silicon tetrafluoride in the reaction mixture. Whereas hydrofluosilic acid forms two mols of hydrogen fluoride for each mol of silicon tetrafluoride, in the presence of equimolar quantities of hydrofluosilicic acid and silicon tetrafluoride equimolar quantities of silicon tetrafluoride and hydrogen fluoride are formed, while in the presence of $SiO_2$ the formation of hydrogen fluoride is suppressed. Thus, by varying the proportions of these components in the reaction mixture, any desired ratio of silicon tetrafluoride to hydrogen fluoride can be produced in this reaction stage. Thus, the proportions of silicon tetrafluoride to hydrogen fluoride in the reaction product can be closely controlled, as may be desirable.

The reaction between hydrofluosilicic acid and sulfuric acid is preferably carried out in a reactor which is equipped with a stirrer. The amount of concentrated sulfuric acid is so adjusted that the reaction mixture contains from about 60 to about 90%, preferably from about 65 to about 75%, sulfuric acid by weight. The reaction may be carried out at an elevated temperature within the range from about 50° to about 150°C.

Silicon tetrafluoride is a gas, as also is hydrogen fluoride, and both gases are readily liberated from the aqueous reaction solution, particularly at elevated temperatures within the stated range. The gas mixture liberated from the reaction mixture also contains water vapour. To separate silicon tetrafluoride from hydrogen fluoride and water, the gases from the reaction mixture may suitably be passed through a scrubber, in which they are brought into contact with the entering concentrated sulfuric acid. Some silicon tetrafluoride dissolves in the entering acid, and thus increases the silicon tetrafluoride concentration of the entering sulfuric acid, but the acid also absorbs substantially all of the hydrogen fluoride and water vapour in the gas, and a stream of relatively pure silicon tetrafluoride can be separated from the acid in the scrubber.

In the third stage of the reaction, as represented in reaction equation 3, silicon tetrafluoride is hydrolyzed in the gas phase with water to form highly active silicon dioxide and gaseous hydrogen fluoride. This hydrolysis may advantageously be carried out in accordance with the process described in Flemmert U.S. Pat. No. 2,819,151. Since this reaction and the conditions under which it is effectively carried out are fully described in this patent, and are therefore well known to those skilled in this art, an amplified description is not required here, but instead the relevant disclosure of U.S. Pat. No. 2,819,151 is hereby incorporated by reference.

The hydrolysis reaction can also be carried out using superheated steam, in which case the temperature in the hydrolysis zone should be kept above about 500°C. The silicon tetrafluoride gas and water vapour are blended and passed through the hydrolysis zone together, in suitable stoichiometric proportions, desirably with an excess of water vapour, and the silica which remains suspended in the gases can then be separated readily from the effluent gas stream from the reaction zone. This separation, being the separation of a solid particulate material from a gas, is readily carried out, unlike the liquid filtration step in U.S. Pat. Nos. 3,128,214 and 3,257,167, referred to above.

For example, the highly reactive silicon dioxide can be separated from the gases by use of cyclone separators or electrostatic filters. The silicon dioxide recovered from this process may contain a proportion of absorbed fluorine on its surface. Treatment of the silica with superheated steam will remove this fluorine.

During the hydrolysis reaction, as well as during the separation of silicon dioxide from the gaseous effluent from the reaction zone, the temperature must be maintained above the dew point of the gaseous reaction products. This prevents condensation of water from the reaction mixture on the silica.

A particularly advantageous method of separating the silicon dioxide from the gaseous effluent is disclosed in U.S. Pat. No. 3,203,759, and this process is preferred in the process of the invention.

The gaseous effluent, following separation of silicon dioxide therefrom, comprises a mixture of hydrogen fluoride, unreacted silicon tetrafluoride, and water vapour, and when the process is carried out according to U.S. Pat. No. 2,819,151, gaseous combustion products such as carbon dioxide, nitrogen, and any excess oxygen. The fluorine-containing constituents of the gaseous mixture are removed by cooling and absorption in water or in acid, thus forming a mixture of hydrofluoric acid and hydrofluosilicic acid. The residual gases, which are now practically free from fluorine, can be vented into the atmosphere without disadvantage or pollution. It is desirable that the aqueous absorbent for the gaseous mixture have as high a fluorine concentration as possible, preferably within the range from about 400 to about 600 grams of fluorine per liter.

This mixture of hydrofluoric acid and hydrofluosilicic acid can then be converted into silicon tetrafluoride, using Reactions 2(a), (b) and (c). The aqueous hydrofluoric acid-hydrofluosilicic acid liquor is blended with concentrated sulfuric acid at a temperature within the range from about 50 to about 150°C. The proportion of acid is preferably adjusted so that the residual acid obtained comprises from about 25 to about 70 parts by weight of water per 100 parts by weight of sulfuric acid.

This reaction results in the formation of silicon tetrafluoride and hydrogen fluoride, and these are separated by vaporization from the acidic aqueous effluent under the reaction conditions. The silicon tetrafluoride can then be separated from the gaseous effluent by passing the gases in countercurrent flow to the entering sulfuric acid in an absorption tower. By this technique, the steam and hydrogen fluoride present with the silicon tetrafluoride are absorbed in the sulfuric acid, and the silicon tetrafluoride is recovered in a practically pure form. Nonetheless, a proportion of silicon tetrafluoride may be absorbed in the sulfuric acid. In order to strip silicon tetrafluoride from the acid, or inhibit such absorption, an inert gas, for example, air or a hydrocarbon, can be introduced into the scrubber with the gaseous effluent to aid in carrying off the silicon tetrafluoride.

If desired, the hydrofluosilicic acid-sulfuric acid solutions can also be recycled to the first hydrofluosilicic acid-sulfuric acid stage, so that all of the silicon tetrafluoride is produced in that stage.

The liquid mixture of sulfuric acid and hydrogen fluoride which is obtained as a product in the process described above can be passed to a reactor, where it is heated to 130° to 200°C. The main portion of the hydrogen fluoride and some steam is vaporized in this reactor. To obtain dry, pure hydrogen fluoride, the gaseous effluent (composed of hydrogen fluoride and steam) can be passed in countercurrent flow to concentrated sulfuric acid. The diluted sulfuric acid obtained as a by-product can be used for the treatment of phosphate rock, or concentrated by evaporation, and then recycled to a hydrofluosilicic acid-sulfuric acid decomposition stage.

The hydrogen fluoride obtained from the reactor is recovered by cooling and condensation, or by absorption in water. This procedure is well known, and need not be described in further detail. The purity of the product obtained is satisfactory for most applications.

Practical combinations of these procedures into complete cyclic processes are shown in the flow sheets of FIGS. 1 and 2.

In the process illustrated in FIG. 1, water and silicon- and fluorine-containing gases are passed into an absorber 1, where silicon tetrafluoride, hydrogen fluoride and any silica which may also be present are absorbed, and dispersed in the water. The mixture of hydrofluosilicic acid, high silica fluosilicic acid, $H_2SiF_6.SiF_4$ and mixtures of either of these with solid silicon dioxide are passed to the combined decomposition unit 2b and scrubber 2a, where concentrated sulfuric acid is added to decompose the hydrofluosilic acid to $SiF_4$, HF and $H_2O$. At least part of the sulfuric acid first passes through the scrubber, in countercurrent flow to the gaseous effluent from the decomposition unit, where it absorbs water (steam) and hydrogen fluoride therefrom. If the proportion of hydrogen fluoride is more than stoichiometrically equivalent to the silica present in the decomposition unit, silica (sand) is added as shown by dashed lines in sufficient amount to take up the excess hydrogen fluoride. The remaining gaseous reaction product, silicon tetrafluoride, is recovered and sent on to the hydrolysis unit 3 where it is blended with additional silicon tetrafluoride from the scrubber 6a in a subsequent stage and with combustible gas and air, and burned, using the process of U.S. Pat. No. 2,819,151 to form silica and hydrogen fluoride.

The residual sulfuric acid in the decomposition unit, now diluted by water, is withdrawn from the decomposition unit 2b, and can be concentrated and recycled.

The silica formed in the hydrolysis unit 3 is carried by the effluent gases to the separator 4, where it is recovered in a highly active form. The effluent gases, containing hydrogen fluoride, water vapour, unreacted silicon tetrafluoride and combustion products, such as carbon dioxide, nitrogen and oxygen, are passed to a second absorber 5, where the silicon tetrafluoride and hydrogen fluoride are absorbed in water or aqueous hydrofluoric acid solution, while the exhaust gases, now relatively free from fluorine-containing materials, are exhausted to the atmosphere.

In order to maintain a low concentration of hydrogen fluoride in the exhaust gases, it may be suitable to introduce water or hydrofluosilicic acid into the absorber 5.

The aqueous absorbent liquor is mixed with concentrated sulfuric acid in decomposition unit 6b. At least part of the sulfuric acid is introduced into scrubber 6a, through which it flows into decomposition unit 6b into countercurrent flow to the effluent gases from the decomposition unit. Silicon tetrafluoride is liberated and is returned to the hydrolysis unit 3 for hydrolysis into hydrogen fluoride and silica. The liquid effluent from decomposition unit 6b, composed of a mixture of sulfuric acid, hydrogen fluoride and water, is passed to decomposition unit 7b, where it is heated to a somewhat more elevated temperature, and combined with additional concentrated sulfuric acid.

The gaseous effluent from this reaction mixture, after scrubbing by at least part of the entering sulfuric acid in scrubber 7a, is composed substantially completely of hydrogen fluoride which can then be recovered in a substantially pure dry form in the condenser 8.

Dilute sulfuric acid is recovered from decomposition units 2b and 7b and can be passed to the evaporator, concentrated, and recycled, or used for reaction with phosphate rock.

Thus the reaction products from the process shown in flow sheet 1 are substantially silica and hydrogen fluoride, both in a relatively pure condition, while all the other products recovered can be recycled, including the dilute sulfuric acid from decomposition units 2b and 7b.

In the process described in the flow sheet of FIG. 2, water and fluorine-and silicon-containing gases are passed through an absorber 1 where silicon tetrafluoride, hydrogen fluoride and any silica that may be present are dissolved and dispersed, forming an aqueous solution of hydrofluosilicic acid, "high silica" fluosilicic acid, $H_2SiF_6.SiF_4$, and mixtures of either of these with silica. This liquor is passed to a decomposition unit 2b where it is combined with concentrated sulfuric acid. Silicon tetrafluoride is liberated and sent via scrubber 2a to a hydrolyzing unit 3. The silicon tetrafluoride is combined there with combustible gas and air, and burned in the vapour phase to form silica and hydrogen fluoride.

The effluent gases, including also unreacted silicon tetrafluoride and water vapour, are passed to a separator 4, such as a cyclone separator, where the finely divided silica is recovered. The remaining gases, composed of unreacted silicon tetrafluoride and hydrogen fluoride, as well as combustion products, and oxygen, are passed to a second absorber 5, where the silicon tetrafluoride and hydrogen fluoride are substantially completely absorbed in water or aqueous hydrogen fluoride. In order to maintain a low concentration of hydrogen fluoride in the exhaust gases, it may be suitable to introduce water or hydrofluosilicic acid into the absorber 5. The resulting gases can be vented safely to the atmosphere, substantially free from fluorine-containing components.

The liquor from the absorber 5 can then be combined with the stream of aqueous hydrofluosilicic acid-containing liquor from the first absorber 1, and passed to the decomposition unit 2b.

The aqueous effluent from the decomposition unit 2b is then sent on to a second decomposition unit 6b, where it is combined with an additional proportion of sulfuric acid. The sulfuric acid passes through the scrubber in countercurrent flow to the gaseous effluent from the decomposition unit 6b. In this case, the gaseous effluent is composed mainly of hydrogen fluoride and water vapour. The water is absorbed in the scrubber 6a, and the remaining gas can be passed to a condenser 7, where substantially pure dry hydrogen fluoride is then recovered.

The sulfuric acid in dilute aqueous form recovered from decomposition unit 6b can be concentrated in an evaporator, and recycled, or used for reaction with phosphate rock.

Thus, it will be seen that in this case as well, the reaction products are silica and hydrogen fluoride. The other by-products can be recovered and recycled, including the dilute sulfuric acid from the decomposition unit.

The following Examples represent preferred embodiments of the invention:

EXAMPLE 1

In a spray tower, the fluorine-and silicon-containing exhaust gases from a superphosphate factory were absorbed in water sprayed across the gas flow. In this way, an acid solution of high silica fluosilicic acid $H_2SiF_6 \cdot SiF_4$ with silicon dioxide suspended therein was obtained. The acid solution contained 2.5 mols of $H_2SiF_6 \cdot SiF_4$ and 0.75 mol of suspended silicon dioxide per liter of solution. This solution was then converted into silica and hydrogen fluoride using the reaction sequence shown in flow sheet 1 (FIG. 1).

271 liters of this mixture and 336 liters of 98% sulfuric acid per hour were introduced into the decomposition unit 2b continuously over a period of several days. The unit was equipped with an agitator and a heating jacket, by means of which the reaction temperature was maintained at 100°C. In the reaction between hydrofluosilicic acid and sulfuric acid, silicon tetrafluoride gas was formed, and this was separated and sent through the scrubber 2a, in which the gas was washed in countercurrent flow with the entering 98% sulfuric acid. Dry pure silicon tetrafluoride at a rate of 965 mols per hour was obtained.

The silicon tetrafluoride (965 mols per hour) was combined with silicon tetrafluoride from the scrubber 6a (449 mols per hour) and with 249 cubic meters per hour of hydrogen gas, and the resulting mixture was then burned in the hydrolyzing unit 3 according to the process described in U.S. Pat. No. 2,819,151, Example 1. The silicon dioxide was separated from the gaseous products according to the procedure described in U.S. Pat. No. 3,203,759, Example 1, and was recovered. In this way there was obtained 55 kg per hour of highly active silicon dioxide, having a specific surface area of 320 square meters per gram, corresponding to an average particle size of 8 m$\mu$.

The fluorine content in the exhaust gases from the hydrolyzing unit 3 was recovered by absorption in water using two spray towers connected in series as the absorber 5. By the addition of water, the concentration was maintained in the first tower at about 555 g. of fluorine per liter of acid, and in the second tower at about 100 g. of fluorine per liter of acid. In both towers, the acid was circulated and cooled, so that the temperature was maintained in the first tower at about 40°C and in the second tower at about 20°C. The fluorine content in the exhaust gases from the second tower was less than 0.05 g of fluorine per cubic meter, and the exhaust gases could be discharged to the atmosphere without danger of pollution.

From the second absorption tower, approximately 190 liters per hour of mixed acids were recovered, containing 12.7 mols of hydrogen fluoride per liter, and 2.38 mols of hydrofluosilicic acid per liter. The mixed acids and 243 liters per hour of 98% sulfuric acid were introduced continuously into the decomposition unit 6b. By means of a heating jacket, the temperature in the unit was maintained at 120°C. Silicon tetrafluoride was formed at a rate of 449 mols per hour, and removed from the unit via the scrubber 6a, in which the effluent gas was washed with the entering 98% sulfuric acid. The silicon tetrafluoride was returned to the hydrolyzing unit 3 for combustion. From the bottom of the unit 6b, 694 kg of acid mixture per hour was recovered, containing sulfuric acid, hydrogen fluoride and water. This mixture was sent to decomposition unit 7b, where the temperature was brought to 150°C by means of a heating jacket, and hydrogen fluoride and water were vaporized. This gaseous effluent mixture was sent via scrubber 7a to the condenser 8, where it was cooled to 0°C so as to condense the hydrogen fluoride and water. 72 kgs per hour of 86% hydrofluoric acid was recovered.

EXAMPLE 2

A mixture of high silica fluosilicic acid, water and suspended silica was obtained by the process described in Example 1, containing 2.5 mols $H_2SiF_6 \cdot SiF_4$ and 0.75 mol suspended $SiO_2$ per liter solution. This solution was then converted into silica and hydrogen fluoride, using the reaction sequence shown in flow sheet 2 (FIG. 2).

Per hour 271 liters of this mixture was combined with mixed acids containing hydrogen fluoride and hydrofluosilicic acid coming from absorption tower 5. The mixed acids and 755 liters per hour of 98% sulfuric acid were introduced continuously into the decomposition unit 2b. By means of a heating jacket, the temperature in the unit was maintained at 100°C. Silicon tetrafluoride was formed at a rate of 1414 mols per hour, and removed from the unit via the scrubber 2a, in which the effluent gas was washed with the entering 98% sulfuric acid. The dry and clean silicon tetrafluoride was sent to the hydrolyzing unit 3 for combustion. From the bottom of the unit 2b 2 017 kgs of acid mixture per hour was recovered, containing sulfuric acid, hydrogen fluoride and water. This mixture was sent to decomposition unit 6b.

The silicon tetrafluoride was combined with 249 cubic meters per hour of hydrogen gas, and the resulting mixture was then burned in the hydrolyzing unit 3 and the silicon dioxide was separated as described in Example 1. In this way there was obtained 56 kgs per hour of highly active silicon dioxide, having a specific surface area of 320 square meters per gram.

The fluorine content in the exhaust gases from the hydrolyzing unit 3 was recovered by absorption in water in the same way as described in Example 1.

The acid mixture coming from reactor 2b, containing sulfuric acid, hydrogen fluoride and water, was sent to decomposition unit 6b where the temperature was brought to 155°C by means of a heating jacket, and hydrogen fluoride and water were vaporized. This gaseous effluent mixture was set via scrubber 6a to the condenser 7 where it was cooled to 0°C so as to condense the hydrogen fluoride. In scrubber 6a the water vapour was absorbed in concentrated sulfuric acid (54 liters per hour) at a temperature of about 100°C. In the condenser 84 kgs per hour of 97% hydrogen fluoride was recovered.

The sulfuric acid coming from the decomposition unit 6b, having a concentration of about 75%, was concentrated by removal of water and recycled.

Having regard to the foregoing disclosure, the following is claimed as the inventive patentable embodiments thereof:

1. A cyclic process for producing hydrogen fluoride and highly active silicon dioxide from silicon-and fluorine-containing waste gases, the silicon and fluorine being present at least as silicon tetrafluoride and hydrogen fluoride, and also silicon dioxide, if present, which comprises combining water and silicon-and fluorine-containing waste gases and absorbing silicon tetrafluoride and hydrogen fluoride in water thereby forming hydrofluosilicic acid; blending hydrofluosilicic acid with concentrated sulfuric acid to decompose hydrofluosilicic acid to form a gaseous effluent comprising tetrafluoride, hydrogen fluoride and water vapour; passing gaseous effluent into contact with sulfuric acid to absorb water and hydrogen fluoride therefrom; recovering silicon tetrafluoride from gaseous effluent and hydrolyzing silicon tetrafluoride by blending with combustible gas and with air, and burning to form silica and hydrogen fluoride; withdrawing residual sulfuric acid; separating silica formed in the hydrolysis; blending effluent gases from the combustion containing hydrogen fluoride, water vapour, unreacted silicon tetrafluoride and combustion products with a member selected from the group consisting of water and aqueous hydrofluoric acid solution to form aqueous hydrofluosilicic acid solution and venting unabsorbed exhaust gases, now relatively free from fluorine-containing materials, to the atmosphere; combining and decomposing hydrofluosilicic acid with concentrated sulfuric acid; liberating and volatilizing hydrogen fluoride and water vapour; removing water vapour; recovering hydrogen fluoride and recovering sulfuric acid.

2. A process according to claim 1 in which the hydrofluosilicic acid is decomposed with concentrated aqueous sulfuric acid, and the hydrogen fluoride separated, and silicon tetrafluoride recycled for hydrolysis in the vapor phase to form silica.

3. A process according to claim 1, in which hydrofluosilicic acid from the silicon-and fluorine-containing gases and from the hydrolysis of silicon tetrafluoride are combined and decomposed together with concentrated aqueous sulfuric acid to form silicon tetrafluoride.

4. A process according to claim 1, in which the silicon-and fluorine-containing compounds from the exhaust gases are absorbed in water.

5. A process according to claim 1, in which silicon dioxide is present in the waste gases and in the hydrofluosilicic acid solution formed therefrom, so that in the hydrolysis of hydrofluosilicic acid with sulfuric acid the by-product is water instead of hydrogen fluoride.

6. A process according to claim 1, which comprises employing molar proportions of hydrofluosilicic acid and silicon tetrafluoride in the hydrolysis with concentrated sulfuric acid adapted to obtain a selected proportion of hydrogen fluoride to silicon tetrafluoride in the reaction mixture.

7. A process according to claim 1, which comprises heating the blend of hydrofluosilicic acid and concentrated sulfuric acid to form the gaseous effluent comprising silicon tetrafluoride and hydrogen fluoride and passing the gaseous effluent through a scrubber, in which it is brought into contact with the entering concentrated sulfuric acid, thereby absorbing substantially all of the hydrogen fluoride and water vapour in the sulfuric acid, and recovering silicon tetrafluoride from the acid in the scrubber.

8. A process according to claim 1, in which silicon tetrafluoride is hydrolyzed in the gas phase with water by burning with combustion gases to form highly active silicon dioxide and gaseous hydrogen fluoride.

9. A process according to claim 1, in which silicon tetrafluoride is hydrolyzed in the gas phase with superheated steam at a temperature above about 500°C., the silicon tetrafluoride gas and water vapour being blended and passed through the hydrolysis zone together, with water vapour, and the silica which is formed separated from the effluent gas stream from the reaction zone.

10. A process according to claim 8, in which the temperature during the hydrolysis is maintained above the dew point of the gaseous reaction products, to prevent condensation of water from the reaction mixture on the silica.

11. A process according to claim 1, in which the gaseous effluent, comprising a mixture of hydrogen fluoride, unreacted silicon tetrafluoride, and water vapour, is absorbed in water or in acid to form a mixture of hydrofluoric acid and hydrofluosilicic acid, and residual gases, substantially free from fluorine, are vented into the atmosphere.

12. A process according to claim 11, in which the mixture of hydrofluoric acid and hydrofluosilicic acid is converted into silicon tetrafluoride and hydrogen fluoride by blending with concentrated sulfuric acid and heating at a temperature within the range from about 50° to about 150°C, at a proportion of acid such that the residual acid obtained comprises from about 25 to about 70 parts by weight of water per 100 parts by weight of sulfuric acid, vaporizing the silicon tetrafluoride and hydrogen fluoride, passing the gaseous effluent in countercurrent flow to the entering sulfuric acid, absorbing the steam and hydrogen fluoride present with the silicon tetrafluoride in the sulfuric acid and recycling the silicon tetrafluoride to the hydrolysis stage.

13. A process according to claim 12, in which an inert gas is introduced with the gaseous effluent to inhibit absorption of the silicon tetrafluoride in the sulfuric acid.

14. A process according to claim 12, in which the hydrofluosilicic acid-sulfuric acid solution is combined with the hydrofluosilicic acid-sulfuric acid solution obtained in the first stage from the waste gases, so that all of the silicon tetrafluoride is produced in that stage.

15. A process according to claim 12, in which the mixture of sulfuric acid and hydrogen fluoride is heated to 130° to 200°C, and the hydrogen fluoride vaporized.

16. A process according to claim 15, in which the hydrogen fluoride is dried by passing in countercurrent flow to concentrated sulfuric acid.

17. A cyclic process which comprises combining water and silicon- and fluorine-containing gases comprising silicon tetrafluoride, hydrogen fluoride and silica if present thereby absorbing and dispersing silicon tetrafluoride, hydrogen fluoride and any silica in the water forming hydrofluosilicic acid; blending a member selected from the group consisting of hydrofluosilicic acid, high silica fluosilicic acid, $H_2SiF_6 \cdot SiF_4$ and mixtures thereof with a member selected from the group consisting of solid silicon dioxide and hydrogen fluoride with concentrated sulfuric acid to decompose hydrofluosilicic acid to $SiF_4$, HF and $H_2O$, the sulfuric acid having previously been passed in countercurrent flow to the gaseous effluent from hydrofluosilicic acid decomposition to absorb water and hydrogen fluoride therefrom; recovering silicon tetrafluoride from gaseous effluent and hydrolyzing it by blending with combustible gas and with air, and burning to form silica and hydrogen fluoride; withdrawing residual sulfuric acid, and concentrating and recycling sulfuric acid; separating silica formed in the hydrolysis; blending effluent gases containing hydrogen fluoride, water vapour, unreacted silicon tetrafluoride and combustion products with a member selected from the group consisting of water and aqueous hydrofluoric acid solution, to form hydrofluosilicic acid and venting the unabsorbed exhaust gases, now relatively free from fluorine-containing materials, to the atmosphere; combining and decomposing hydrofluosilicic acid with concentrated sulfuric acid, the acid having previously been passed in countercurrent flow to effluent gases from the decomposition; liberating and volatilizing silicon tetrafluoride and recycling it for hydrolysis into hydrogen fluoride and silica; heating the residual solution, composed of a mixture of sulfuric acid, hydrogen fluoride and water, to volatilize hydrogen fluoride and water vapour; condensing the water vapour; and recovering hydrogen fluoride.

18. A cyclic process according to claim 17, which comprises decomposing the hydrofluosilicic acid with concentrated aqueous sulfuric acid containing from about 60 to about 90% sulfuric acid by weight at a temperature within the range from about 50 to about 150°C to form gaseous silicon tetrafluoride and hydrogen fluoride.

19. A cyclic process according to claim 17, in which the silicon-and fluorine-containing compounds from the exhaust gases are absorbed in water.

20. A cyclic process according to claim 17, in which silicon dioxide is present in the waste gases and in the hydrofluosilicic acid solution formed therefrom, so that in the hydrolysis of hydrofluosilicic acid with sulfuric acid, the by-product is water instead of hydrogen fluoride.

21. A cyclic process according to claim 17, in which silicon tetrafluoride is hydrolyzed in the gas phase with water by burning with combustion gases to form highly active silicon dioxide and gaseous hydrogen fluoride.

22. A cyclic process according to claim 17, in which silicon tetrafluoride is hydrolyzed in the gas phase with superheated steam at a temperature above about 500°C., the silicon tetrafluoride gas and water vapour being blended and passed through the hydrolysis zone together, with an excess of water vapour, and the silica which is formed separated from the effluent gas stream from the reaction zone.

23. A cyclic process according to claim 17, in which the mixture of hydrofluoric acid and hydrofluosilicic acid is converted into silicon tetrafluoride and hydrogen fluoride by blending with concentrated sulfuric acid and heating at a temperature within the range from about 50 to about 150°C, at a proportion of acid such that the residual acid obtained comprises from about 25 to about 70 parts by weight of water per 100 parts by weight of sulfuric acid, vaporizing silicon tetrafluoride and hydrogen fluoride, passing gaseous effluent in countercurrent flow to entering sulfuric acid and absorbing steam and hydrogen fluoride present with silicon tetrafluoride in said sulfuric acid and recycling silicon tetrafluoride to the hydrolysis stage.

24. A cyclic process according to claim 17, in which an inert gas is introduced with the gaseous effluent to inhibit absorption of the silicon tetrafluoride in the sulfuric acid.

25. A cyclic process according to claim 17, in which the hydrofluosilicic acid-sulfuric acid solution is combined with the hydrofluosilicic acid-sulfuric acid solution obtained in the first stage from the waste gases, so that all of the silicon tetrafluoride is produced in that stage.

26. A cyclic process according to claim 17, in which the mixture of sulfuric acid and hydrogen fluoride is heated to 130° to 200°C, and the hydrogen fluoride vaporized.

27. A cyclic process according to claim 17, in which the hydrogen fluoride is dried by passing in countercurrent flow to concentrated sulfuric acid.

28. A cyclic process according to claim 1, which comprises absorbing silicon tetrafluoride and hydrogen fluoride in a member selected from the group consisting of water and aqueous hydrogen fluoride to form a hydrofluosilicic acid-containing liquor; venting the remaining gases to the atmosphere, substantially free from fluorine-containing components; recycling and combining the hydrofluosilicic acid-containing liquor with the aqueous hydrofluosilicic acid-containing liquor obtained from the waste gases; combining the aqueous effluent from the sulfuric acid decomposition of said hydrofluosilicic acid with an additional proportion of sulfuric acid; volatilizing hydrogen fluoride and water vapour; removing the water vapour by scrubbing with concentrated sulfuric acid; and recovering dry hydrogen fluoride; and recovering the sulfuric acid in dilute aqueous form; and concentrating the sulfuric acid.

29. A cyclic process according to claim 1, which comprises blending the effluent gases, containing hydrogen fluoride, water vapour, unreacted silicon tetrafluoride and combustion products with a member selected from the group consisting of water and aqueous hydrofluoric acid solution, to form hydrofluosilicic acid and venting the unabsorbed exhaust gases, now relatively free from fluorine-containing materials, to the atmosphere; combining and decomposing the hydrofluosilicic acid with concentrated sulfuric acid, the acid having previously been passed in countercurrent flow to the effluent gases from the decomposition; liberating and volatilizing silicon tetrafluoride and recycling it for hydrolysis into hydrogen fluoride and silica; heating the residual solution, composed of a mixture of sulfuric acid, hydrogen fluoride and water, to volatilize hydrogen fluoride and water vapour; condensing the water vapour; and recovering the hydrogen fluoride in a dry form.

* * * * *